United States Patent [19]

Davis

[11] 4,032,452

[45] June 28, 1977

[54] ELECTRICALLY REGENERATED ION EXCHANGE SYSTEM

[75] Inventor: Thomas A. Davis, Vestavia Hills, Ala.

[73] Assignee: Sybron Corporation, Rochester, N.J.

[22] Filed: Nov. 13, 1975

[21] Appl. No.: 631,841

[52] U.S. Cl. .............................. 210/243; 204/180 B
[51] Int. Cl.$^2$ ......................................... B01D 57/00
[58] Field of Search ........ 204/180 B; 210/24, 30 R, 210/36, 243, 269

[56] References Cited

UNITED STATES PATENTS

| | | | |
|---|---|---|---|
| 2,812,300 | 11/1957 | Pearson | 210/30 R |
| 3,006,828 | 10/1961 | Gaysowski | 204/180 B |
| 3,645,884 | 2/1972 | Gilliland | 204/180 B |
| 3,705,846 | 12/1972 | Kato et al. | 204/180 B |
| 3,767,600 | 10/1973 | Albright | 210/24 |
| 3,885,069 | 5/1975 | Roberts et al. | 210/36 |

OTHER PUBLICATIONS

Davis et al., Electro–Regeneration of Ion Exchange Resins, National Institute of Health Report AK–2–70–2108–F, 1972.
Gittens et al., Some Experimental Studies of Electrodeionization through Resin Packed Beds, U.K. Atomic Energy Authority Report No. AERE–R4517, (1964).
Sammon et al., An Experimental Study of Electrodeionization and its Application to the Treatment of Radioactive Wastes, U.K. Atomic Energy Authority Report No. AERE–R3137, (1960).
Prober et al., Electrolytic Regeneration of Ion Exchange Resins, Aero Chem. Research Labs, Inc. Report, Contract OSW 14–01–0001–1255, (1968).
Investigation and Development of an Electrolytic System for the Conversion of Saline and Brackish Waters, OSW Research and Development Progress Report No. 51, (1961).

Primary Examiner—Thomas G. Wyse
Assistant Examiner—Ivars Cintins
Attorney, Agent, or Firm—Theodore B. Roessel; James A. Rich

[57] ABSTRACT

The electrical efficiency of an electrically regenerated ion exchange system is improved by using elongated ion exchange members having a continuous ion exchange phase that is more conductive in the exhausted form than it is in the regenerated form. Preferably, the system includes anion exchange members that extend through the wall of the demineralization compartment closest to the anode but do not extend through the wall of the demineralization compartment closest to the cathode, and cation exchange members that extend through the wall of the demineralization compartment closest to the cathode but do not extend through the wall of the demineralization compartment closest to the anode.

17 Claims, 3 Drawing Figures

ELECTRICALLY REGENERATED ION EXCHANGE SYSTEM

BACKGROUND OF THE INVENTION

This invention relates to ion exchange, and more particularly, to ion exchange systems that are regenerated electrically.

The concept of electrically regenerating ion exchange resins has been actively investigated for more than twenty years, but previous systems using this approach have not appeared to be economically competitive with standard chemical processes for regenerating the resins. Early investigators apparently all attempted to electrically regenerate the strong-acid and strong-base resins that were commercially available. They achieved considerable demineralization of aqueous solutions of electrolytes, but the quantities of resin and expenditures of electrical energy required made them uneconomical. For example, in batch regeneration experiments with mixed beds, described in "Concentration of Radioactive Aqueous Wastes", *Ind. Eng. Chem.*, 47, 61–67 (1955), Walters, Weiser and Marek obtained 6.2% regeneration of the ion exchange capacity of their resins with 52% coulomb efficiency, i.e., 0.52 equivalents of salt were removed from the resin per Faraday of current passing through the resin bed, but by the time the resin was 14% regenerated the coulomb efficiency for the entire time period had dropped to 37% and the actual coulomb efficiency at the end of the regeneration was only 5%.

During steady-state experiments described in SOME EXPERIMENTAL STUDIES OF ELECTRODEIONISATION THROUGH RESIN PACKED BEDS, United Kingdom Atomic Energy Authority Report AERE-R 4517. (1964), Gittens and Watts removed 13.5% of the $NaNO_3$ from a $10^{-3}$ M solution with a coulomb efficiency of 59%, but the coulomb efficiency dropped to 10% when they removed 28% of the salt from a $10^{-4}$ M solution.

In a more recent study, ELECTROLYTIC REGENERATION OF ION EXCHANGE RESINS, Final Report to the Office of Saline Water on Contract 14-01-0001-1255 (1968), Prober and Myers obtained regeneration rates greater than 1.0 equivalent per Faraday per resin bed in some experiments, but their efficiencies were much lower than that for most cases. They concluded that electroregeneration was technically feasible, but did not appear to be economically feasible.

A report by the Electric Storage Battery Company to the Office of Saline Water, INVESTIGATION AND DEVELOPMENT OF AN ELECTROLYTIC SYSTEM FOR THE CONVERSION OF SALINE AND BRACKISH WATERS, O.S.W. Research and Development Progress Report No. 51, (1961), suggests that electrically regenerated ion exchange systems might be made more efficient or economical by using rods of ion exchange material or membranes extending between an anode chamber and a cathode chamber. Membrane type mixed bed systems of this sort were operated successfully, but the report concluded that the energy consumption did not compare favorably with established processes and that no means for improving the economics were evident.

In a study conducted for the Artificial Kidney-Chronic Uremia Program of the National Institute of Arthritis, Metabolism and Digestive Disease, discussed in ELECTRO-REGENERATION OF ION EXCHANGE RESINS, National Institutes of Health Report AK-2-70-2108-F (1972), Davis and Lacey demonstrated that electroregeneration can be quite efficient if resins are selected that have higher electrical conductivity in the exhausted form than in the regenerated form. With a mixture of weak-acid cation exchange resin and weak-base anion exchange resin, they achieved 99% demineralization of 0.002 N NaCl solutions in a continuous processes with over 50% coulomb efficiency and about 50 watt hr. of power consumed per equivalent of salt removed.

SUMMARY OF THE INVENTION

An object of this invention is to provide a more efficient electrically regenerated ion exchange system. This is accomplished by using elongated ion exchange members having a continuous ion exchange phase that is more conductive in the exhausted form than in the regenerated form. The continuous ion exchange phase reduces electrical power requirements by providing a low resistance path for the transport of ions from a demineralization compartment to electrode or waste compartments. Since the ion exchange materials are more conductive in the exhausted form, the electrical current tends to bypass the regenerated portions of the ion exchange bed, which means that the current is used more efficiently.

Another object of this invention is to provide an electrically regenerated ion exchange system with multiple mixed beds of elongated ion exchange members. A first demineralization compartment is provided adjacent to the anode compartment and a second demineralization compartment is provided adjacent to the cathode compartment. These demineralization compartments are separated by a waste compartment or by alternating waste and additional demineralization compartments. The first demineralization compartment contains a plurality of elongated anion exchange members that are exposed to the anode compartment but are not exposed to the waste compartment of the cathode side of this demineralization compartment, and a plurality of elongated cation exchange members that are exposed to the waste compartment on the cathode side of the first demineralization compartment. Similarly, the second demineralization compartment contains a plurality of elongated cation exchange members that are exposed to the cathode compartment but are not exposed to the waste compartment on the anode side of the second demineralization compartment, and a plurality of elongated anion exchange members that are exposed to the waste compartment on the anode side of the second demineralization compartment. This keeps anions from passing from the waste compartment into the first demineralization compartment and keeps cations from passing from the waste compartment into the second demineralization compartment.

The same technique may be used to keep cations from the anode compartment and anions from the cathode compartment from passing into the demineralization compartments. According to this embodiment of the invention, the cation exchange members in the demineralization compartment adjacent to the anode compartment are not exposed to the anode compartment and the anion exchange members in the demineralization compartment adjacent to the cathode compartment are not exposed to the cathode compartment.

DRAWINGS

DETAILED DESCRIPTION

Figure 1:
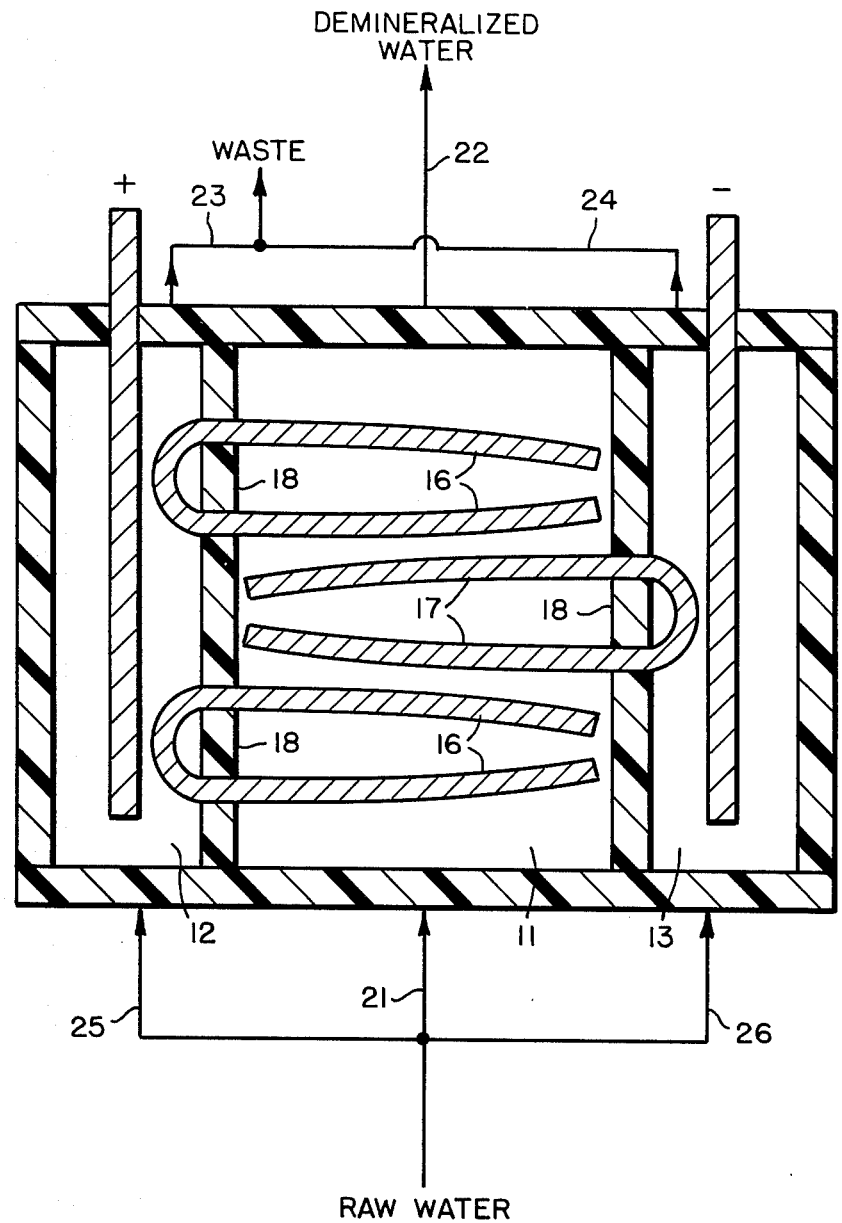
FIGS. 1 and 2 are schematic cross-sectional elevation views of two embodiments of this invention.

FIG. 1 illustrates a single cell embodiment of this invention with a demineralization compartment 11 between an anode compartment 12 and a cathode compartment 13. The demineralization compartment 11 contains alternating layers of anion exchange fabric 16 and cation exchange fabric 17. As will be explained in more detail below, the fabrics are preferably produced by coating a fabric substrate with a polyelectrolyte and a crosslinking agent to form a continuous ion exchange phase having the desired ion exchange and conductivity properties on the fabric.

The fabrics are wound around spacers 18, which define the walls between the demineralization compartment and the anode and cathode compartments, so that the anion exchange fabric 16 extends into the anode compartment 12 and the cation exchange fabric 17 extends into the cathode compartment 13. The other ends of the fabrics do not extend through the walls into the electrode compartments. Thus, anions in the cathode compartments and cations in the anode compartment are prevented from migrating into the demineralization compartment when an electrical potential is imposed upon the unit, as they would tend to do if the fabrics extended through both walls.

Figure 2:
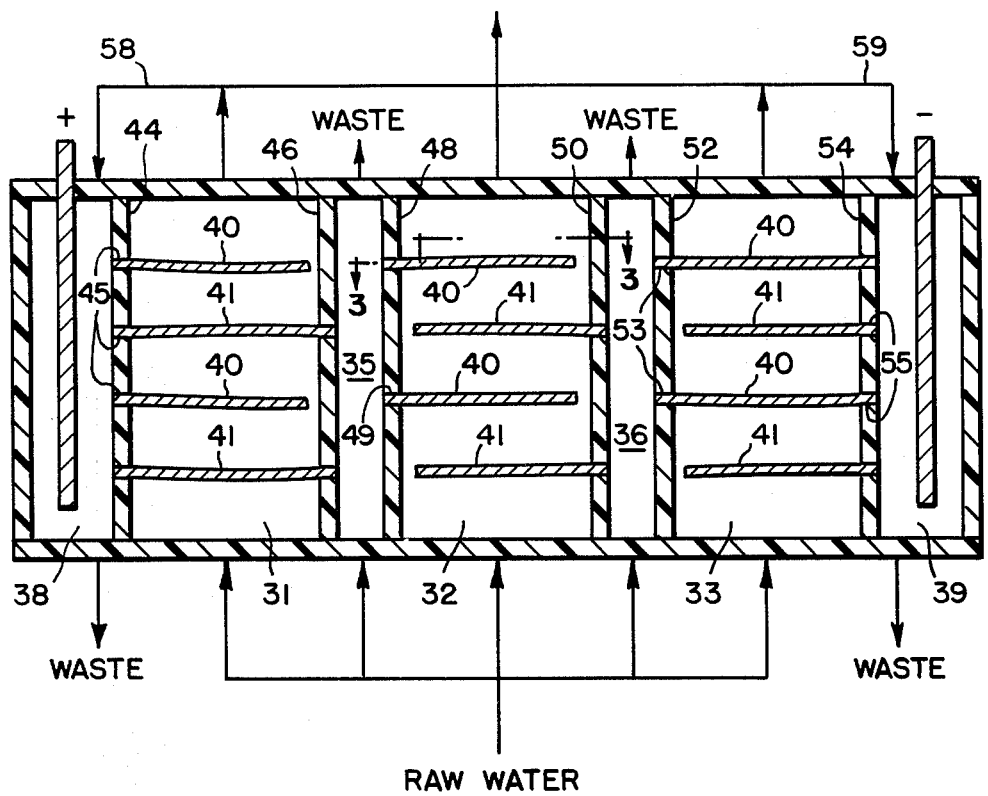

The fluid to be demineralized, such as water, is supplied to the demineralization compartment 11 by pipe 21. As the water passes up through the layers of fabric, cations in the water are exchanged for hydrogen ions and anions in the water are exchanged for hydroxyl ions. The demineralized product is discharged from the top of the demineralization compartment 11 through pipe 22, and concentrated waste is discharged from the electrode compartments through lines 23 and 24. Raw water may be fed to the electrode compartments through lines 25 and 26 to keep the concentration in these compartments at the desired level and/or prevent precipitation in the compartments. However, in some cases there is no need to supply fluid to these compartments because seepage from the demineralization compartment to the electrode compartments will supply all the fluid needed therein. In other cases, it may be desirable to utilize product water to feed one or both electrode compartments, as illustrated in FIG. 2.

The unit may be operated either as a continuous, steady-state system, or in a cyclic manner. In steady-state operation, the electrodes are energized while the water being demineralized is passing through the unit. The ions that are removed from the water are continuously passed along the fabric to the electrode compartments. Thus, the quality of the product water does not vary, as long as the composition of the raw water, flow rates and other operating conditions remain relatively constant. The unit can be operated indefinitely in this mode. In cyclic operation the electrodes are energized to regenerate the ion exchange fabrics during periods when water is not being demineralized. This mode of operation may reduce the danger of electrical shock in some instances. Also, if the feed water contains solutes (such as multivalent ions or organics) that are picked up by the resins but not removed by electro-regeneration as readily as other solutes, cyclic operation may be advantageous to allow chemical regeneration to remove these solutes from the resins.

When the electrodes are energized, anions are passed along the anion exchange fabric 16 to the anode compartment 12 and cations are passed along the cation exchange fabric 17 to the cathode compartment. The rate at which particular ions are passed along to the electrode compartments depends mainly upon the conductivity of the ion exchange phase of the fabric in various ionic forms. Ions that increase the conductivity of the fabric will be removed preferentially because a higher proportion of the current passing through the bed will go through the portions of the bed that are in these ionic forms. Thus, the rate at which ions are removed, and the electrical efficiency, are increased by using ion exchange materials that have a relatively high conductivity when equilibrated in solutions of the ions to be removed from the fluid being treated.

Anion exchange materials with tertiary amine functional groups are preferred for demineralization of water because they have higher conductivities in the salt or exhausted forms than they do in the free base or regenerated form. As may be seen from the report by Davis and Lacey referred to on page 3 of this application, these materials can be electrically regenerated more efficiently than typical strong base anion exchange materials. Similarly, cation exchange materials with carboxylic functional groups are preferred because they are more conductive in the salt or exhausted form than they are in the $H^+$ or regenerated form. Thus, they can be electrically regenerated more efficiently than other types of cation exchange materials, such as sulphonic materials.

Tertiary amine and carboxylic ion exchange materials are more conductive in the chloride and sodium forms than they are in the carbonate, bicarbonate and calcium forms. Thus, when these materials are used in typical electrically regenerated water demineralization systems, carbonate, bicarbonate and calcium ions tend to build up in the bed. This build-up can be reduced by increasing the electrical power, but it is generally more efficient to chemically regenerated the bed periodically, e.g., with a dilute HCl or NaCl solution, or to soften the water upstream of the electrically regenerated unit.

I generally prefer to adjust the numbers, cross-sectional areas, and/or the conductivities of the anion and cation exchange members so that the total anion removal rate is roughly the same as the total cation removal rate. This keeps the pH of the water roughly neutral. Of course, as in conventional ion exchange processes, it may be desirable to utilize beds of a single type of ion exchange material in some instances.

Figure 3:
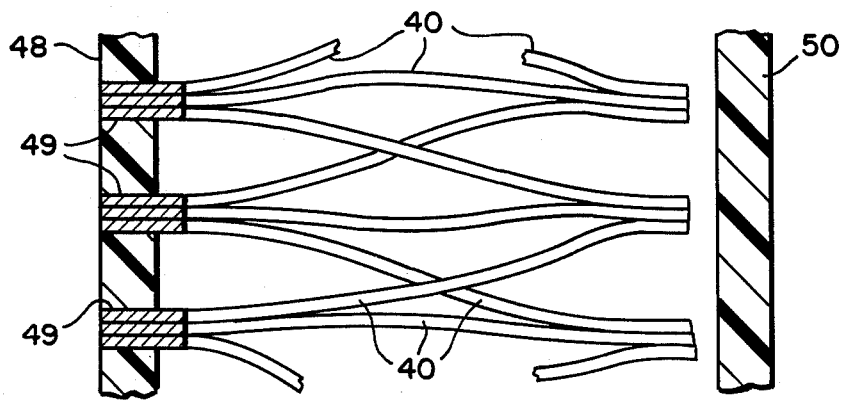
FIG. 3 is a view taken along lines 3—3 of FIG. 2.

FIGS. 2 and 3 illustrate a multi-cell embodiment of this invention, with alternating demineralization compartments 31, 32, 33 and waste compartments 35, 36 between an anode compartment 38 and a cathode compartment 39. Each demineralization compartment contains alternating layers of anion exchange fibers 40 and cation exchange fibers 41. The fibers are arranged in alternating layers so that cation or anion exchange fibers can be exposed to the waste compartments without exposing the other type of fiber in the same demineralization compartment to the same waste compartment.

The left hand ends of the anion exchange fibers 40 in demineralization compartment 31 extend into holes 45 in a header 44 that separates this demineralization compartment from the anode compartment, and the left hand ends of the anion exchange fibers in demineralization compartments 32 and 33 extend into holes 49, 53 in headers 48, 52 that separate demineralization compartment 32 from waste compartment 35 and demineralization compartment 33 from waste compartment 36. The right hand ends of the anion exchange fibers in demineralization compartment 33 extend through holes 55 in the header 54 separating demineralization compartment 33 from the cathode compartment 39, but the right hand ends of the anion exchange fibers in demineralization compartments 31 and 32 do not extend through the headers 46, 50 that separate demineralization compartment 31 from waste compartment 35 and demineralization compartment 32 from waste compartment 36. Thus, anion exchange fibers are not exposed to the waste compartment adjacent to the cathode side of the demineralization compartment they are in.

Similarly, the right hand ends of the cation exchange fibers 41 in demineralization compartments 31, 32 and 33 extend through holes in headers 46, 50 and 54 respectively, and the left hand end of the cation exchange fibers in demineralization compartment 31 extend through header 44, but the left hand ends of the demineralization fibers in demineralization compartment 32 and 33 do not extend through headers 48 and 52.

By this arrangement, cations and anions that have been removed from the water being demineralized are prevented from moving out of a waste compartment into a demineralization compartment. For example, a sodium ion passed along a cation exchange fiber in compartment 31 to waste compartment 35 cannot move out of this compartment into demineralization compartment 32 because the anion exchange fibers in compartment 32 reject sodium ions, and the sodium ions and other cations in waste compartment 35 cannot reach the cation exchange fibers in demineralization compartment 32. Thus, any number of demineralization compartments can be arranged hydraulically in parallel and electrically in series, which reduces the cost of a system designed to handle a given quantity of water because the electrodes are a smaller part of the overall system. This arrangement also makes it simpler to design a system that fits the available electrical power.

In the system shown in FIG. 2, a small portion, typically 10%, of the demineralized product discharged from the demineralization compartments is fed to the anode and cathode compartments through line 58 and 59. With feed waters having a high calcium content, this prevents $CaCO_3$ from precipitating in the cathode compartment. It also minimizes migration of sodium and other cations from the anode compartment into demineralization compartment 31.

With demineralized product water supplied to the anode and cathode compartments, both anion and cation exchange materials may be exposed to both the anode and cathode compartments without causing undue migration of cations from the anode compartment and anions from the cathode compartment. However, it is believed that the type of construction shown in FIG. 1, in which cation exchange members are not exposed to the anode compartment and anion exchange members are not exposed to the cathode compartment, will be preferable in most instances.

As may be seen from FIG. 3, the fibers from any one bundle at either end of a demineralization compartment are preferably distributed between a number of different bundles at the other end of the compartment. This distributes the fibers in each layer in a random, open pattern that promotes even distribution of the water through the bed.

The fibers and fabrics for these systems may be produced by a variety of techniques known to those skilled in the fabric and/or ion exchange arts. For example, fibers may be made by extruding or spinning homogeneous fibers of polyelectrolytes and then crosslinking them to attain the requisite physical properties, by spinning homogeneous fibers of polymers that can be chemically modified to produce the desired ion exchange properties, or by coating filaments or yarns with a layer of ion exchange material.

I prefer to prepare the fibers for use in this invention by coating a substrate with a layer of ion exchange material. The use of a substrate provides tensile strength and allows the materials to be made by an inexpensive coating process rather than more expensive fiber spinning processes. The ion exchange coating can be produced by in situ polymerization or by coating the fibers with a polyelectrolyte and a crosslinking agent. In situ polymerization may be less expensive for large scale production. On the other hand, coating fibers with a polyelectrolyte and a crosslinking agent is somewhat simplier.

Polyelectrolytes with tertiary amine functional or ion exchange groups preferred for anion exchange materials and polyelectrolytes with carboxylic functional groups are preferred for the cation exchange members.

Polyelectrolytes having a high proportion of functional groups are preferred, since this increases the ion exchange capacity of the fibers. Alkylene imine polymers and oligomers such as polyethyleneimine and tetraethylenepentamine are preferred fpr anion exchange fibers, and olefinic carboxylic acids such as polyacrylic acid are preferred for cation exchange members.

These polyelectrolytes may be reacted with a number of well known crosslinking agents to produce coatings having the desired ion exchange and conductivity properties. Dibromopropane, dibromobutane, epichlorohydrin, epibromohydrin, and formaldehyde are among the crosslinking agents that may be used with polyethyleneimine and tetraethylenepentamine. Anion exchange fibers having high conductivity in the exhausted mode and adequate mechanical properties have been produced by crosslinking polyethyleneimine with dibromopropane, but epichlorohydrin and formaldehyde are somewhat less expensive cross-linking agents.

Hexamethylenediisocyanate, hexamethylenediamine and glycerol are among the crosslinking agents that may be used with polyacrylic acid. Hexamethylenediamine is preferred because hexamethylenediisocyanate must be used with the anhydrous form of polyacrylic acid, which is considerably more expensive, and glycerol crosslinked coatings tend to soften, apparently due to hydrolysis of the ester linkage formed in the crosslinking reaction, upon exposure to the high pH of the cathode compartment.

As is well known in the ion exchange art, the degree of crosslinking has a considerable affect on physical and ion exchange properties. When fibers are coated with a mixture of polyelectrolyte and crosslinking agent, the stiffness of the fibers generally increases and the ion exchange capacity generally decreases with increased crosslinking. Since most of the physical strength needed in the system can be provided in the substrate, I prefer to use relatively low degrees of crosslinking in order to optimize the ion exchange and conductivity properties of these fibers. For example, with polyethyleneimine and epichlorohydrin, about 1 to 10 percent crosslinking has been found to be satisfactory. 10% crosslinking increases the amount of the ion exchange layer that can be coated on a fiber, but satisfactory loadings are achieved with 1% crosslinking, and the lower values of crosslinking increase the conductivity of the coated fiber. Thus, approximately 1% crosslinking is preferred with polyethyleneimine and epichlorohydrin.

Cellulosic fibers are preferred as substrates for the foregoing coating materials. The crosslinking agents react with hydroxyl radicals on the fibers to bond the polyelectrolytes to the fibers. Cotton fibers are especially preferred since they have a rough texture that further enhances the adhesion of the ion exchange coating to the substrate.

It is generally preferable to produce the maximum loading or coating thickness of ion exchange material on the fiber in order to produce the maximum ion exchange capacity and conductivity. Loading of 100% (weight of coating to weight of uncoated fiber) or greater can be achieved with well known fiber coating techniques.

The same coating techniques may also be utilized to produce ion exchange fabrics. As the substrate for such materials I prefer to use a cotton fabric having a higher fabric count in the direction perpendicular to the electrodes than in the direction parallel to the electrodes. This increases the overall conductivity of the system without decreasing the hydraulic permeability.

In some cases it may be desirable to utilize cotton fibers in one direction in the fabric and other materials, such as monofilaments, which are not readily coated with the materials discussed above, in the other direction. This form of construction may be less expensive since all of the ion exchange coating will be on the fibers running at right angles to the electrodes. However, fabrics containing nonconductive fibers of this sort may require slightly higher voltages to achieve the same demineralization performance in steady state operation and may have less capacity for handling surges in the flow rate or conductivity of the feed.

The following examples demonstrate the results that may be achieved with this invention.

Example I

In order to provide a basis for comparison between electrically regenerated units utilizing resin beads and units using elongated ion exchange members, tests were conducted with a mixed bed of Amberlite® IRC-84, a carboxylic weak acid cation exchange resin manufactured by Rohm & Haas Company, and Duolite® ES-340, a tertiary amine weak base anion exchange resin manufactured by Diamond Shamrock Chemical Company. These resins were selected because the previous tests by Davis and Lacey described in the report listed on page 2 indicated that these resins had the best electrical properties for a system of this sort. A bed of these resins (50% of each) 1 inch thick and 1.5 inches high was placed between a 1 inch by 3 inch platinium anode and a 1 inch by 3 inch stainless steel cathode. The resins were separated from the anode by an Ionac MA 3475 R anion exchange membrane and from the cathode by an Ionac MC 3470 cation exchange membrane. The membranes were 5.5 inches apart. A solution of about 0.002 N NaCl with a conductivity of 250 $\mu$mho/cm was fed into the resin bed and the electrode compartments. With a potential of 90 volts across the bed, the current flow was 11 milliamps. At steady state operation, the conductivity of the product was 84 $\mu$mho/cm with a flow rate of 2.5 ml/min. This change in conductivity represents about 66% demineralization. The coulomb efficiency during this process was 51% and the power consumption was 6.6 watt hours per liter of demineralized product.

Example II

The resin beds and membranes in the test system used in Example I were replaced with a bundle consisting of 500 anion exchange fibers and 500 cation exchange fibers. The anion fibers were produced by coating 0.015 inch diameter cotton yarn with a methanol solution of polyethyleneimine and 50% dibromopropane. (All figures for percentages of crosslinking agents in these examples are by weight based on the amount of polyelectrolyte in the coating mixture.) The coating was applied by drawing the yarn through an 18 gauge needle attached to a 50 cc syringe containing the coating solution and through a heated column where the crosslinking reaction began and the fibers were dried. The dry fibers were wound continuously on a take up spool and cured overnight at 60° C to complete the crosslinking reaction. The fibers were then washed throughly with tap water to remove any unreacted material. The loading of ion exchange material on the fiber, as measured by the increase in weight of the dry yarn, was 100%. The conductivity of these fibers was measured using the techniques described in appendix A of the report by Davis and Lacey referred to above. The fibers were packed into one of a pair of matched conductivity cells connected in series. An HCl solution was passed through the two conductivity cells and the solution was diluted until the equiconductance point, i.e., the point at which the conductivity of the fibers was equal to the conductivity of the equilibrating solution, was reached. The conductivity of these fibers at this point was 17,500 $\mu$mhos/cm.

The cation exchange fibers were produced by coating 0.015 inch diameter cotton fibers with an aqueous solution of polyacrylic acid, having a molecular weight of 370,000, and 20% glycerol. The loading of the ion exchange coating on the fiber was 82% and the conductivity of these fibers at the equiconductance point in NaOH was 16,000 $\mu$mho/cm.

The cation and anion exchange fibers were clamped under an adjustable gate to form a fiber bundle 5.5 inches long, 1 inch thick and 0.75 inch high, with both anion and cation exchange fibers exposed to both electrode compartments. As in Example I, an NaCl solution was supplied to the center demineralization compartment, however, in this experiment the electrode rinse water was supplied by seepage between the fibers from the demineralization compartment to the electrode compartments. The system was operated at varying voltages and feed rates, with the results shown in the following Table, which compares these results with the results from the resin bead bed used in Example I.

TABLE I

| Example | Flow Rate, ml/min Product | Waste | Conductivity, μmho/cm Feed | Product | Waste | Voltage V | Current mA | Coulomb Efficiency[a] | Power watt hr./liter |
|---|---|---|---|---|---|---|---|---|---|
| I | 2.5 | 6.0 | 250 | 84 | 400 | 90 | 11 | 0.51 | 6.60 |
| IIA | 2.6 | 1.1 | 248 | 17 | 950 | 91 | 17 | 0.48 | 9.92 |
| IIB | 5.1 | 0.6 | 248 | 28 | 2350 | 90 | 22 | 0.68 | 6.47 |
| IIC | 5.1 | 0.4 | 248 | 35 | 2000 | 68 | 20 | 0.73 | 4.44 |
| IID | 5.1 | — | 248 | 41 | 2500 | 51 | 19 | 0.74 | 3.17 |
| IIE | 5.1 | — | 248 | 36 | 2000 | 35 | 16 | 0.76 | 1.83 |
| IIF | 5.1 | — | 248 | 76 | 2000 | 25 | 13 | 0.90 | 1.06 |

[a] Calculated by $n = \frac{0.0134}{\text{current}} \times (\text{flow} \times \Delta \text{ product conductivity})$ As may be seen by the increase in current that was obtained with the same voltages in Example IIA and IIB, the fiber system had a much higher total conductivity than the resin bed system, despite the fact that the bed was only half as high. As a result, demineralization was much more efficient with the fiber unit. In Example IIB, where the power consumption was roughly equal to the power consumed by the resin bead bed, the conductivity of the water was reduced from 248 to 28 μmhos per centimeter, which represents about 87% demineralization. With similar power consumption, the resin bead bed only produced 66% demineralization. In Example IIF, where the degree of demineralization produced by the fiber bed was roughly equivalent to the performance of the resin bead bed, the power consumption was less than one sixth as much. This demonstrates the importance of the increases in conductivity provided by this invention.

Examples III–IX

Anion and cation exchange fibers prepared by different techniques were tested to determine their conductivity at the equiconductance points in both exhausted and regenerated forms. In examples III and VII, anion and cation exchange fibers were prepared by suspending Duolite® ES-340 anion exchange resin or Amberlite® IRC-84 cation exchange resin by hydroxyethylcellulose and extruding the suspension through an orifice. In Example III the suspension contained 50% ES-340. In Example VII, the suspension contained 41% IRC-84.

In Examples IV–VI, VIII and IX anion and cation exchanged members were prepared by coating fibers and fabrics with polyelectrolytes and crosslinking agents. In example IV, cotton sewing thread was immersed in a cold methanol solution of polyethyleneimine having a molecular weight of 100,000 and varying amounts of epichlorohydrin (1% in Example IVA, 10% in Example IVB and 100% in Example IVC) and then cured in an oven. In Example V, cotton yarn was passed through a methanol solution of polyethyleneimine, having a molecular weight of 1800, and 50% dibromopropane. For Example VI, a cotton-acetate fabric was immersed in a mixture of tetraethylenepentamine and 1.7 grams of epichlorohydrin, 0.56 grams of phenol and 1.1 gram of acetone per gram of tetraethylenepentamine. The ingredients were thoroughly mixed in an ice bath, the fabric was immersed in the solution, stretched on a pin frame and cured in an oven overnight at 60° C. The loading of the ion exchange coating on the fabric was 72%.

In example VIII cotton thread was immersed in a hexane solution of hexamethylenediisocyanate, then dried and immersed in a p-dioxane solution of polyacrylic acid with a molecular weight of 250,000. The fibers were dried overnight at 60° C. to remove the dioxane.

In example IX cotton-acetate fabric was immersed in an aqueous solution of polyacrylic acid, having a molecular weight of 370,000, and 4% hexamethylenediamine. The loading of ion exchange material on the fabric was 61%.

The conductivities of these fibers and fabrics were measured in various equilibrating solutions using the techniques described above and are shown in the following Table.

TABLE II

| | | ANION EXCHANGERS | |
|---|---|---|---|
| | | Conductivity-μmho/cm | |
| Example | Type | Exhausted HCl | Regenerated NaOH |
| III | Extruded | 2,900 | 320 |
| IVA | Coated | 68,000 | 1,500 |
| IVB | Coated | 17,000 | 440 |
| IVC | Coated | 2,500 | 780 |
| V | Coated | 27,000 | 310 |
| VI | Coated | 24,000 | 690 |

| | | CATION EXCHANGERS | |
|---|---|---|---|
| | | Conductivity-μmho/cm | |
| Example | Type | Exhausted HCl | Regenerated NaOH |
| VII | Extruded | 7,990 | 570 |
| VIII | Coated | 15,000 | 32 |
| IX | Coated | 10,200 | 390 |

As may be seen from the Table, the coated fibers had a much higher conductivity in the exhausted mode than the fibers produced by extruding mixtures of ion exchange resins and a film forming polymer, despite the fact that the resins were among the most conductive of those studied by Davis and Lacey. This demonstrates the importance of the continuous conductive ion exchange layers produced by this invention.

Example IV also demonstrates the importance of the degree of crosslinking. Example IVA, produced with polyethyleneimine and 1% epichlorohydrin, had much higher conductivities than the fibers produced with 10% epichlorohydrin (Example IVB) and 100% epichlorohydrin (IVC). Furthermore, the coating produced with a 100% epichlorohydrin was so stiff that the coating broke off easily, whereas the coatings produced with lesser amounts had excellent mechanical properties.

The foregoing examples demonstrate the improvements obtainable by the use of elongated ion exchange members with a continuous ion exchange phase having desirable conductivity properties, such as the fibers and fabrics described above, in electrically regenerated systems for the demineralization of aqueous solutions. Of course, it should be understood that the foregoing examples are merely illustrative and many changes may be made in the systems, coating materials, substrates, fluids being treated and the like described above within the scope of this invention, which is defined by the following claims.

I claim:

1. In an electrically regenerated ion exchange system having an anode, a cathode and elongated ion exchange members having one end extending towards said anode and another end extending towards said cathode, whereby ions pass along said elongated ion exchange members toward said anode or said cathode, the improvement wherein said elongated ion exchange members have a continuous ion exchange phase that is more conductive in the exhausted form than in the regenerated form.

2. A system according to claim 1 wherein said ion exchange phase comprises an anion exchange material that is more conductive in the chloride form than in the free base form.

3. A system according to claim 2 wherein said anion exchange material has tertiary amine functional groups.

4. A system according to claim 3 wherein said anion exchange material comprises the reaction product of an alkylene imine polymer or oligomer and a crosslinking agent.

5. A system according to claim 4 wherein said alkylene imine polymer is polyethyleneimine or tetraethylenepentamine.

6. A system according to claim 1 wherein said ion exchange phase comprises a cation exchange material that is more conductive in the sodium form than in the hydrogen form.

7. System according to claim 6 wherein said cation exchange material has carboxylic functional groups.

8. A system according to claim 7 wherein said cation exchange material comprises the reaction product of an olefinic carboxylic acid and a crosslinking agent.

9. System according to claim 8 wherein said olefinic carboxylic acid comprises polyacrylic acid.

10. A system according to claim 1 wherein said elongated ion exchange member comprises a substrate and a continuous coating of ion exchange material.

11. A system according to claim 10 wherein said coating is applied to said substrate by applying a polyelectrolyte and a crosslinking agent to said substrate.

12. A system according to claim 10 wherein said substrate comprises a cellulosic fiber or fabric.

13. A system according to claim 12 wherein said cellulosic fiber or fabric comprises cotton.

14. An electrically regenerated ion exchange system comprising:
    an anode compartment and a cathode compartment;
    a first demineralization compartment positioned intermediate said anode and cathode compartments and adjacent to said anode compartment;
    a second demineralization compartment positioned intermediate said anode compartment and said cathode compartment and adjacent to said cathode compartment;
    at least one waste compartment between said first and said second demineralization compartments;
    said first demineralization compartment containing a plurality of elongated cation exchange members having first ends extending towards said anode compartment and second ends exposed to a waste compartment positioned between said first and second demineralization compartments and adjacent to said first demineralization compartment, and a plurality of elongated anion exchange members having first ends that are exposed to said anode compartment and second ends that extend towards but are not exposed to said waste compartment adjacent to said first demineralization compartment;
    said second demineralization compartment containing a plurality of elongated anion exchange members having first ends extending towards said cathode compartment and second ends exposed to a waste compartment positioned between said first and second demineralization compartments and adjacent to said second demineralization compartment, and a plurality of elongated cation exchange members having first ends that are exposed to said cathode compartment and second ends that extend towards but are not exposed to said waste compartment adjacent to said second demineralization compartment.

15. A system according to claim 14 wherein said first ends of cation exchange members in said first demineralization compartment are not exposed to said anode compartment.

16. A system according to claim 14 wherein said first ends of anion exchange members in said second demineralization compartment are not exposed to said cathode compartment.

17. A system according to claim 14 further comprising:
    at least one additional demineralization compartment between said first and second demineralization compartments;
    a first waste compartment between said first demineralization compartment and said additional demineralization compartment and adjacent to said additional demineralization compartment;
    a second waste compartment between said second demineralization compartment and said additional demineralization compartment and adjacent to said additional demineralization compartment;
    said additional demineralization compartment containing:
        a plurality of elongated anion exchange members having first ends that are exposed to said first waste compartment and second ends that extend towards but are not exposed to said second waste compartment, and
        a plurality of elongated cation exchange members having first ends that are exposed to said second waste compartment and second ends that extend towards but are not exposed to said first waste compartment.

* * * * *